(12) United States Patent
Uchiyama

(10) Patent No.: US 7,616,875 B2
(45) Date of Patent: Nov. 10, 2009

(54) IMAGING DEVICE

(75) Inventor: Takayuki Uchiyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 204 days.

(21) Appl. No.: 11/344,187

(22) Filed: Feb. 1, 2006

(65) Prior Publication Data
US 2007/0003268 A1   Jan. 4, 2007

(30) Foreign Application Priority Data

| Feb. 8, 2005 | (JP) | ............................. 2005-031213 |
| Jan. 27, 2006 | (JP) | ............................. 2006-019788 |

(51) Int. Cl.
*G03B 17/00* (2006.01)
(52) U.S. Cl. ............................. 396/80; 396/87; 396/92; 396/102
(58) Field of Classification Search .................. 396/80, 396/87, 102, 92
See application file for complete search history.

(56) References Cited

U.S. PATENT DOCUMENTS

| 4,743,932 | A | * | 5/1988 | Matsui | ........................ | 396/92 |
| 4,903,065 | A | * | 2/1990 | Taniguchi et al. | ............. | 396/92 |
| 5,003,336 | A | * | 3/1991 | Karasaki et al. | ................ | 396/92 |
| 6,694,097 | B2 | * | 2/2004 | Tsunemiya et al. | ........... | 396/80 |
| 6,882,369 | B1 | * | 4/2005 | Ito | ............................. | 348/345 |
| 7,450,838 | B2 | * | 11/2008 | Nonaka | ........................ | 396/80 |
| 7,471,330 | B2 | * | 12/2008 | Okawara | ..................... | 348/353 |
| 2003/0020825 | A1 | * | 1/2003 | Higuma et al. | .............. | 348/354 |
| 2005/0046308 | A1 | * | 3/2005 | Endo | .......................... | 310/317 |
| 2005/0168621 | A1 | * | 8/2005 | Kageyama et al. | .......... | 348/349 |
| 2005/0185086 | A1 | * | 8/2005 | Onozawa | ..................... | 348/349 |
| 2006/0008265 | A1 | * | 1/2006 | Ito | ............................. | 396/125 |
| 2006/0165403 | A1 | * | 7/2006 | Ito | ............................. | 396/123 |
| 2006/0181634 | A1 | * | 8/2006 | Onozawa | ..................... | 348/345 |

FOREIGN PATENT DOCUMENTS

| JP | 09-021943 | * | 1/1997 |
| JP | A 9-21943 | | 1/1997 |

* cited by examiner

*Primary Examiner*—W B Perkey
*Assistant Examiner*—Michael A Strieb
(74) *Attorney, Agent, or Firm*—Oliff & Berridge, PLC

(57) ABSTRACT

An imaging device includes an imaging element that receives a subject light flux from an imaging lens that forms a subject image, and converts the subject light flux to an electrical signal; and a control device that selects one of first imaging preparatory processing for executing imaging preparatory processing based upon an output signal from the imaging element and second imaging preparatory processing for executing imaging preparatory processing based upon an output signal from a light receiving element other than the imaging element in correspondence to an extent of decentering of the imaging lens.

7 Claims, 4 Drawing Sheets

IMAGING DEVICE

INCORPORATION BY REFERENCE

The disclosures of the following priority applications are herein incorporated by reference:
Japanese Patent Application No. 2005-031213 filed Feb. 8, 2005
Japanese Patent Application No. 2006-019788 filed Jan. 27, 2006

BACKGROUND OF THE INVENTION

1. Field of the Invention

The present invention relates to an imaging device, and more specifically, it relates to processing executed on a value to be used for an imaging operation in the imaging device.

2. Description of Related Art

In a single lens reflex camera, part of the subject light flux departing an imaging lens toward an image forming plane is guided to a photometering sensor and a focus detection (range finding) sensor to enable calculation of the photometering value and the range value for the subject. The imaging lens may allow the imaging optical system to be shifted or tilted relative to the image forming plane. When capturing an image with such an imaging lens with the imaging optical system in a shifted or tilted state, the photometering operation and the focus detection operation cannot be accurately executed since the angle of incidence of the subject light flux at the photometering sensor or the focus detection sensor is altered from the angle of incidence that is measured when the imaging optical system is not shifted or tilted. Japanese Laid Open Patent Publication No. H9-21943 discloses an optical device that calculates a range value once the extent of shift or tilt of the imaging lens becomes equal to or beyond a predetermined value by using a correction value that has been stored in advance corresponding to the extent of the shift or tilt.

However, in the optical device disclosed in the publication described above, too, the range value is corrected by using a predetermined correction value, which means that the resulting range value is not completely accurate. In other words, if the extent of decentering of the incident subject light flux due to the shift or the tilt is outside an allowable range at the focus detection sensor unit, the range finding operation cannot be executed.

SUMMARY OF THE INVENTION

An imaging device according to a first aspect of the present invention includes an imaging element that receives a subject light flux from an imaging lens that forms a subject image, and converts the subject light flux to an electrical signal; and a control device that, in correspondence to an extent of decentering of the imaging lens, selects one of first imaging preparatory processing for executing imaging preparatory processing based upon an output signal from the imaging element and second imaging preparatory processing for executing imaging preparatory processing based upon an output signal from a light receiving element other than the imaging element.

In the imaging device according to the first aspect, it is preferable that the imaging preparatory processing includes one of photometering processing for calculating a subject luminance value and focus match processing for focusing the imaging lens on a subject. It is preferable that the light receiving element includes one of a photometering sensor that outputs a signal to be used in the photometering processing and a focus detection sensor that outputs a signal to be used in the focus match processing. The control device may execute the imaging preparatory processing through the second imaging preparatory processing if the extent of decentering of the imaging lens is less than a predetermined value and executes the imaging preparatory processing through the first imaging preparatory processing if the extent of decentering of the imaging lens is equal to or beyond the predetermined value.

An imaging device according to a second aspect of the present invention includes an imaging element that receives a subject light flux from an imaging lens that forms a subject image, and converts the subject light flux to an electrical signal; a lens information detection device that detects lens information corresponding to the imaging lens; and a control device that, in correspondence to results of detection executed by the lens information detection device, selects one of first imaging preparatory processing for executing imaging preparatory processing based upon an output signal from the imaging element and second imaging preparatory processing for executing imaging preparatory processing based upon an output signal from a light receiving element other than the imaging element.

In the imaging device according to the second aspect, the lens information detection device may detect information indicating whether or not the imaging lens allows a shift or a tilt as the lens information.

A camera body of a digital camera that allows an imaging lens to be detachably mounted according to a third aspect of the present invention includes an imaging element that receives a subject light flux from the imaging lens and converts the subject light flux to an electrical signal; a lens information detection device that detects lens information corresponding to the imaging lens; and a control device that, in correspondence to results of detection executed by the lens information detection device, selects one of first imaging preparatory processing for executing imaging preparatory processing based upon an output signal from the imaging element and second imaging preparatory processing for executing imaging preparatory processing based upon an output signal from a light receiving element other than the imaging element.

DESCRIPTION OF PREFERRED EMBODIMENT

The following is an explanation of an imaging device achieved in an embodiment of the present invention. The imaging device in the explanation is embodied as a digital camera.

(Structure)

Figure 1:
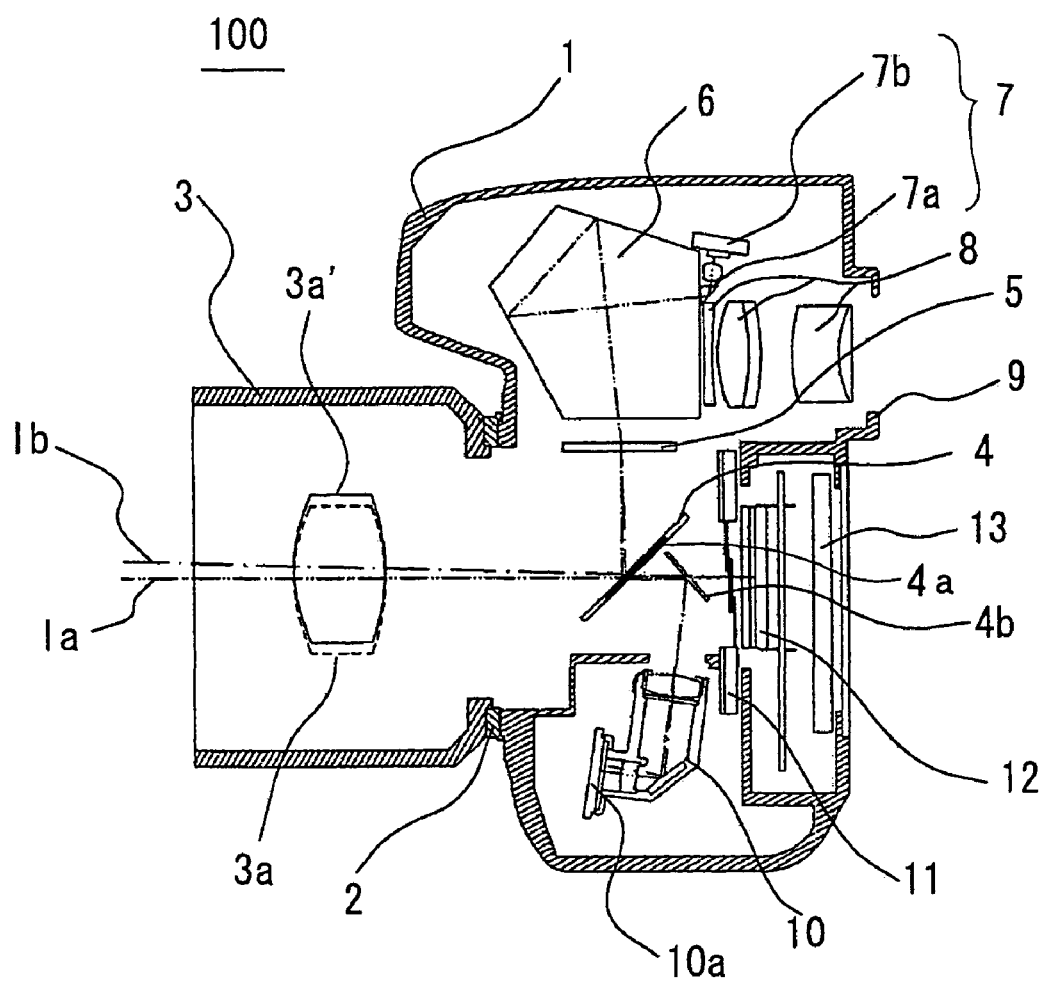
FIG. 1 is a sectional view of a digital camera achieved in an embodiment of the present invention in a mirror-down state.

FIG. 1 is a sectional view of a digital camera 100 achieved in an embodiment of the present invention.

The digital camera 100 is a lens interchangeable single lens reflex digital camera that allows an imaging lens 3 to be detachably mounted at a lens mount 2 disposed at a camera body 1.

A subject light flux originating from a subject is transmitted through an imaging optical system 3a of the imaging lens 3, is bent upward at a mirror 4 and forms an image at a focusing screen (viewfinder screen) 5. The subject image formed and diffused at the focusing screen 5 is transmitted through a pentaprism 6 and an eyepiece optical system 8 and is then observed through an eyepiece finder 9. The subject image formed and diffused at the focusing screen 5 and then advancing through the pentaprism 6 is also condensed at a condenser optical system 7a of a photometering device 7, and the condensed light enters a photometering sensor (a photometering element, i.e., a light receiving element) 7b.

The subject light flux having been transmitted through a semi-transmissive portion 4a present over part of the mirror 4 is bent downward at a sub-mirror 4b, enters a range finding device 10 and forms an image at a focus detection sensor (a focus detection or range finding element, i.e., a light receiving element) 10a. In addition, as shown in the figure, a shutter 11 (in a closed state in FIG. 1) and an imaging element 12 are disposed to the rear of the mirror 4, and a rear liquid crystal monitor 13 is disposed at the rear surface of the camera body 1.

Figure 2:
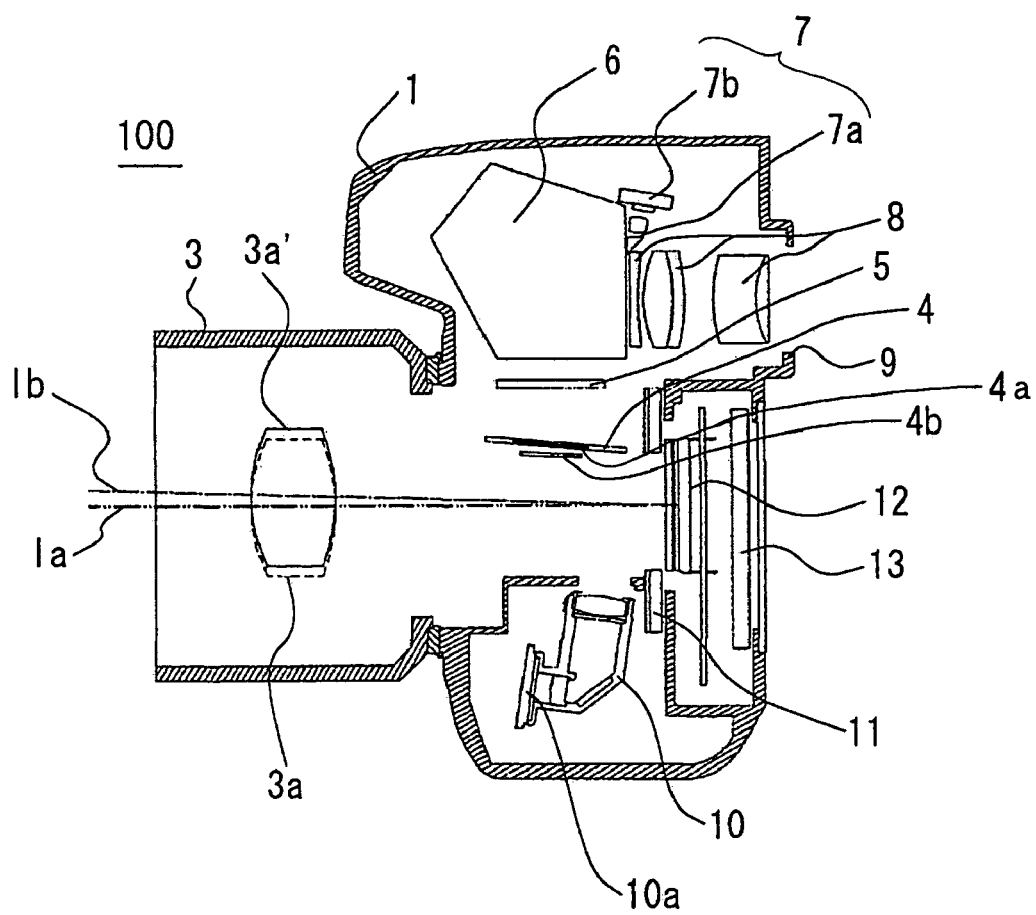
FIG. 2 is a sectional view of the digital camera in FIG. 1 in a mirror-up state.

FIG. 2 is a sectional view of the digital camera 100 in a mirror-up state in which the mirror 4 and the sub-mirror 4b are both set outside the optical path of the subject light flux, with the shutter 11 in an open state. When the mirror 4 and the sub-mirror 4b are outside the optical path of the subject light flux and the shutter 11 is in an open state, the subject light flux having been transmitted through the imaging optical system 3a of the imaging lens 3 passes through the opening at the shutter 11 and forms an image at the imaging element 12.

The imaging lens 3 includes the imaging optical system 3a constituted with a plurality of lenses including a focal adjustment optical system. The imaging lens 3 enables a shift operation for moving at least one of the lenses constituting the imaging optical system 3a along a direction parallel to the image forming surface at the imaging element 12 and a tilt operation for tilting at least one of the lenses constituting the imaging optical system 3a relative to the image forming surface at the imaging element 12. In other words, through the imaging lens 3, the optical axis of the subject light flux passing through the imaging optical system 3a and entering the imaging element 12 can be decentered. The extents of shift and tilt in the imaging optical system 3a relative to the image forming surface at the imaging element 12 are respectively detected by a shift quantity detector 3b and a tilt quantity detector 3c (see FIG. 3). The shift quantity detector 3b and the tilt quantity detector 3c may respectively detect the shift quantity and the tilt quantity based upon specific combinations of patterns and brushes.

The imaging lens 3 includes a communication contact point (not shown) that becomes connected with the camera body 1 of the digital camera 100 so as to enable communication with the camera body 1 when the imaging lens 3 is connected with the camera body 1. A shift quantity signal and a tilt quantity signal indicating the extents to which the imaging optical system 3a is shifted and tilted, detected by the shift quantity detector 3b and the tilt quantity detector 3c, are transmitted to the camera body 1 via the communication contact point. In addition, lens information indicating whether or not the interchangeable lens mounted at the camera body 1 is the imaging lens 3, too, is transmitted to the camera body 1 via the communication contact point.

(Control Block Diagram)

Figure 3:
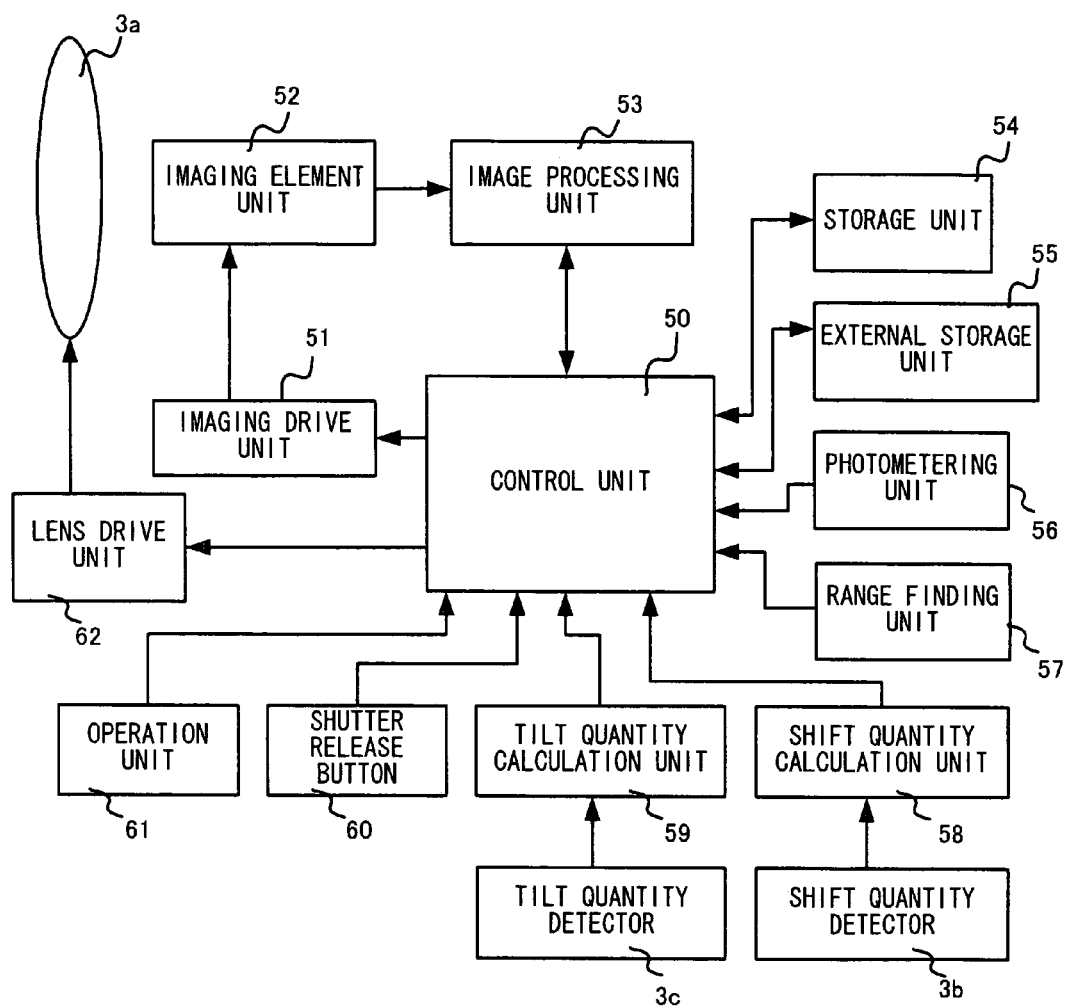
FIG. 3 is a control block diagram of the digital camera.

FIG. 3 is a control block diagram of the digital camera 100.

A control unit 50 disposed at the camera body 1 is connected with an imaging drive unit 51, an image processing unit 53, a storage unit 54, an external storage unit 55, a photometering unit 56, a focus detection unit 57, a shift quantity calculation unit 58, a tilt quantity calculation unit 59, a shutter release button 60, an operation unit 61, a lens drive unit 62 and the like, and controls these units.

The imaging drive unit 51 is connected with an imaging element unit 52. The imaging element unit 52 includes the imaging element 12 and the like. The imaging drive unit 51 executes control for electrical charge storage, signal read and the like at the imaging element 12. The imaging element 12 is a photoelectric conversion element such as a CCD or a CMOS, that outputs image data obtained by converting a subject image formed at the light receiving surface of the imaging element 12 to an electrical signal. Under the control executed by the imaging drive unit 51, the imaging element 12 outputs subject image data stored as electrical charges by photoelectrically converting the received subject image to the image processing unit 53.

The image processing unit 53 executes various types of processing on the image signal received from the imaging element unit 52, and creates image data to be recorded, display image data to be displayed at the rear liquid crystal monitor 13 and the like. The storage unit 54 includes a storage medium such as a RAM, a ROM or an EEPROM, and a program, program initial values, value settings and the like to be used in the processing executed by the control unit 50 and the image processing unit 53 are stored in the storage unit 54. The storage unit 54 is also used as a temporary data storage area during the processing. The external storage unit 55 is a storage medium such as a detachable memory card. The control unit 50 and the external storage unit 55 are structured so as to be able to exchange signals via a connector portion (not shown).

The photometering unit 56, which includes the photometering device 7 constituted with the condenser lens 7a and the photometering sensor 7b, calculates a subject luminance value through a method of the known art based upon an output from the photometering sensor 7b. In addition, the photometering sensor 7b is disposed so as to monitor a plurality of photometering areas set within the subject imaging area, and thus, multiple segment exposure metering of the known art, whereby subject luminance values are calculated based upon luminance signals detected in the individual areas is achieved.

The focus detection unit 57 is a focal point detection device adopting a phase difference detection method of the known art, which includes the focus detection device 10. The focus detection unit 57 detects a pair of subject light fluxes resulting from pupil-split at the focus detection sensor 10a, and calculates the extent of defocusing of the subject based upon a signal provided by the focus detection sensor 10a.

The shift quantity calculation unit 58, having received a shift quantity signal detected at the shift quantity detector 3b at the imaging lens 3, calculates the extent to which the imaging lens 3 is shifted based upon the received shift quantity signal. The tilt quantity calculation unit 59, having received a tilt quantity signal detected at the tilt quantity detector 3c at the imaging lens 3, calculates the extent to which the imaging lens 3 is tilted based upon the received tilt quantity signal. The shutter release button 60 is a shutter release button of the known art with a first switch SW1 and a second switch SW2 thereof entering an ON state respectively in response to a halfway press operation and a full press operation. The operation unit 61 is an operation member operated by the user to operate the digital camera 100 and select settings, which includes a cross-shaped key, a rotary dial and an exposure correction button.

The lens drive unit 62 drives the focal adjustment optical system of the imaging optical system 3a under control executed by the control unit 50

(Camera Operations)

In the digital camera 100 achieved in the embodiment, a photographing mode in which an imaging operation and image processing are executed under imaging processing conditions set by the user, a menu mode in which various functions are set by the user by reviewing a menu screen on display at the rear liquid crystal monitor 13 or an image display mode for displaying a photographed image at the rear liquid crystal monitor 13 may be selected as the operation mode. Since the menu mode processing and the image display mode processing are of the known art, an explanation thereof is omitted.

The following is an explanation of the processing executed in the photographing mode at the digital camera 100 achieved in the embodiment.

(Photographing Mode Processing)

In the photographing mode, photometering processing for calculating the subject luminance value and focus match processing for achieving focus on a specific subject by adjusting the focal adjustment optical system in the imaging optical system 3a and the like are executed in response to a halfway press operation of the shutter release button 60. Once the subject luminance value is calculated, photographing value settings such as the shutter speed and the aperture value are determined as necessary. It is to be noted that the processing executed in response to a halfway press operation of the shutter release button 60 as described above, i.e., the preparatory processing executed prior to the actual image capturing operation, is to be referred to as imaging preparatory processing. As the shutter release button 60 is then pressed all the way down, imaging processing is executed based upon the photographing value settings having been selected through the imaging preparatory processing.

(Optical Path of Incident Light Flux Altered by Shift and Tilt)

The optical paths of the subject light flux leading to the photometering sensor 7b and the focus detection sensor 10a when the imaging optical system 3a of the imaging lens 3 is neither shifted nor tilted, are now explained.

In FIGS. 1 and 2, the imaging optical system 3a of the imaging lens 3 which is not shifted or tilted is indicated with the dotted line, and the corresponding subject light flux is indicated by Ia (the two-point chain line). As shown in FIG. 1, when the imaging optical system 3a of the imaging lens 3 is neither shifted nor tilted, the subject light flux having been bent upward at the mirror 4 forms an image and is then diffused at the focusing screen 5, as the subject light flux would in a camera mounted with a standard imaging lens that does not allow a shift operation or a tilt operation. The subject light flux having become diffused at the focusing screen 5 passes through the pentaprism 6 and becomes condensed at the condenser optical system 7a. The condensed light is then received at the photometering sensor 7b. The photometering unit 56 is thus able to measure the subject luminance.

The subject light flux having been transmitted through the semi-transmissive portion 4a at the mirror 4 becomes bent downward at the sub-mirror 4b and enters the focus detection device 10 constituted with a focal point detection device. The subject light flux having entered the focus detection device 10 enters the focus detection sensor 10a. The focus detection unit 57 calculates the extent of defocusing based upon output from the focus detection sensor 10a. Based upon the defocus quantity thus calculated, the control unit 50 executes focus match processing to achieve focus by driving the focal adjustment optical system of the imaging optical system 3a via the lens drive unit 62.

As described above, when the imaging optical system 3a of the imaging lens 3 is neither shifted nor tilted, photometering processing and focus detection processing are executed accurately by the photometering unit 56 and the focus detection unit 57 operating independently of each other by using the subject light flux.

Next, the optical paths of the subject light flux leading to the photometering sensor 7b and the focus detection sensor 10a when the imaging optical system 3a of the imaging lens 3 is shifted or tilted, are explained. The explanation is given by assuming that the imaging optical system 3a is shifted.

The solid line 3a' indicates the imaging optical system 3a of the imaging lens 3 when it is shifted upward relative to the imaging element 12, with Ib (the one-point chain line) indicating the corresponding subject light flux. Let us now consider a subject light flux forming an image at the center of the imaging surface at the imaging element 12. As shown in FIG. 2, when the imaging optical system 3a of the imaging lens 3 is shifted upward, the angle of incidence of the optical axis of the subject light flux Ib that forms an image at the center of the imaging plane becomes tilted further upward relative to the angle of incidence of the subject light flux Ia measured when the imaging optical system 3a is not shifted. In other words, as the imaging optical system 3a is shifted, the angle of incidence of the subject light flux at the imaging surface at the imaging element 12 is altered and, as shown in FIG. 1, the angle of incidence of the subject light flux at a specific position within the image forming surface at the focusing screen 5 is also altered in the mirror-down state in FIG. 1.

The condenser optical system 7a and the photometering sensor 7b at the photometering device 7 are disposed by taking into consideration the diffusion of the light flux corresponding to the angle of incidence of the subject light flux at the focusing screen 5, and the photometering value is calculated by detecting the diffused light flux. Accordingly, if a shift or tilt of the imaging optical system 3a alters the angle of incidence of the subject light flux at the focusing screen 5, the state of the diffused light flux also changes, resulting in a change in the photometering value obtained through the calculation. For this reason, a shift or a tilt of the imaging optical system 3a of the imaging lens 3 destabilizes the photometering accuracy. If the extent of a shift or tilt exceeds a predetermined value, accurate photometering is no longer possible.

At the focus detection device 10, too, the focus detection sensor 10a and the like are disposed in correspondence to the angle of incidence of the subject light flux at a virtual image forming plane assumed in the focus detection device 10. Accordingly, if the angle of incidence of the subject light flux at the image forming plane in each focus detection (range finding) area changes due to a shift or tilt of the imaging optical systems 3a, the presence of the shielding mask or the like for pupil splitting in the focus detection device 10 induces an eclipse. Thus, a shift or a tilt of the imaging optical system 3a of the imaging lens 3 destabilizes the focus detection accuracy, and if the extent of shift or tilt exceeds a predetermined extent, the focus detection operation itself is disabled.

(Switching Photometering and Focus Detection Methods)

As described above, if the imaging optical system 3a of the imaging lens 3 is shifted or tilted by an extent equal to or beyond a predetermined extent, the photometering processing by the photometering unit 56 and the focus detection processing by the focus detection unit 57 become destabilized or disabled, and thus, the photometering processing or the focus match processing cannot be executed accurately.

When the photometering processing and the focus detection processing are destabilized or disabled, the photometering processing and the focus match processing are executed based upon signal output from the imaging element unit 52 by forming an image with a subject light flux at the imaging element 12 without utilizing the photometering unit 56 or the focus detection unit 57 in the digital camera 100 in the embodiment. More specifically, the shift quantity and the tilt quantity (e.g., a shift quantity equal to or beyond ±2 mm and a tilt quantity equal to or beyond ±3°) at which the photometering processing and the focus detection processing are destabilized or disabled, are set as predetermined values, and if the shift quantity or the tilt quantity observed for the imaging optical system 3a of the imaging lens 3 is equal to or beyond the corresponding predetermined value, control is switched so as to execute the photometering processing and the focus match processing based upon output signals from the imaging element unit 52.

The photometering processing and the focus match processing may be executed based upon the output signals provided by the imaging element 12 by adopting methods of the known art. For instance, the output signals from the imaging element unit 52 may be processed by the image processing unit 53 and the control unit 50 so as to calculate the photometering value (the subject luminance value) in the photometering processing. The focus match processing may be executed by adopting a contrast AF method of the known art. In the contrast AF method, the lens drive unit 62 drives the focal adjustment optical system of the imaging optical system 3a so as to engage the focal adjustment optical system in a single-direction scan from the infinity side to the close-up side. The control unit 50 compares the levels of contrast indicated in the output signals from the imaging element 12, each obtained as the focal adjustment optical system under the scan drive control moves by a predetermined pitch, and thus calculates the focused position of the focal adjustment optical system at the imaging optical system 3a.

It is to be noted that while an explanation is given above on an example in which photometering processing and focus match processing are executed based upon signals output from the imaging element unit 52 when the imaging optical system 3a is shifted or tilted by an extent equal to or beyond the predetermined value, the present invention is not limited to this example and the photometering processing and focus match processing methods may be switched based upon both the shift quantity and the tilt quantity. For instance, when the imaging optical system 3a is shifted and tilted, the photometering processing and focus match processing methods may be switched by making a decision as to whether a value calculated by incorporating the values of the shift quantity and the tilt quantity is equal to or beyond a predetermined value or less than the predetermined value. For instance, the photometering processing and the focus match processing may be executed by using the output signals provided by the imaging element 12 when the shift quantity is equal to or beyond ±1 mm and the tilt quantity is equal to or beyond ±1°.

(Imaging Processing Flow)

Figure 4:
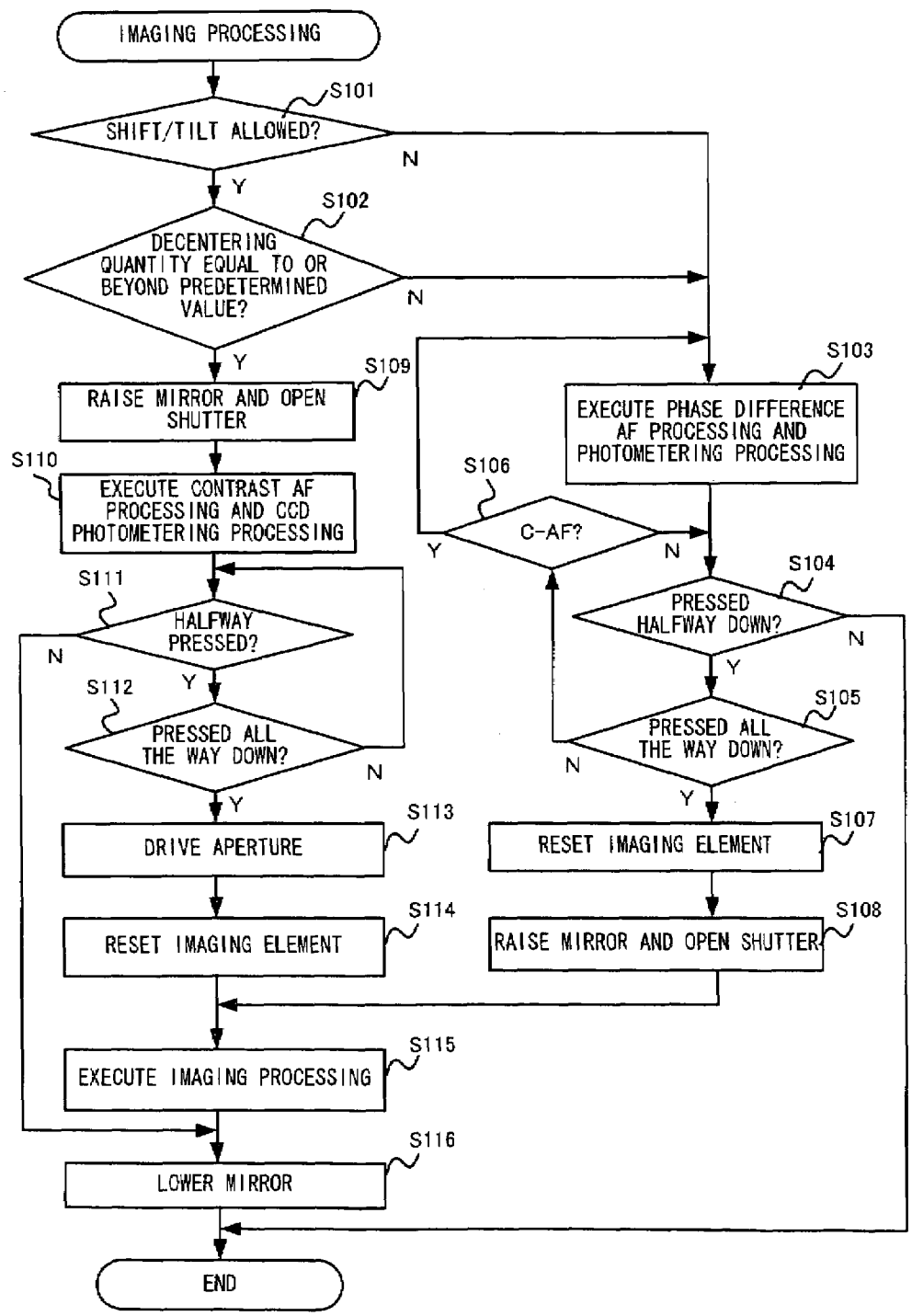
FIG. 4 presents a flowchart of imaging processing procedure executed in the digital camera.

The following is an explanation of the flow of the imaging processing which starts in response to a depression of the shutter release button 60 in the digital camera 100 achieved in the embodiment set in the photographing mode, given in reference to the flowchart presented in FIG. 4.

The imaging processing in FIG. 4 starts in response to a halfway press operation (as the SW1 enters an ON state) of the shutter release button 60 in the photographing mode.

In step S101, a decision is made based upon the lens information obtained from the imaging lens 3 as to whether or not the imaging lens 3 mounted at the camera body 1 allows a shift operation or a tilt operation of the imaging optical system 3a. If it is decided that the imaging lens 3 mounted at the camera body 1 allows a shift operation or a tilt operation, the operation shifts into step S102, whereas if it is decided that the imaging lens 3 mounted at the camera body 1 does not allow a shift operation or a tilt operation, the operation shifts into step S103.

In step S102, a decision is made as to whether or not the extent of decentering of the imaging optical system 3a of the imaging lens 3 relative to the imaging element 12, i.e., the extent of shift or tilt of the imaging optical system 3a is equal to or beyond the predetermined value set in advance as the criterion for switching the processing methods. If it is decided that the decentering quantity is equal to or beyond the predetermined value, the operation proceeds to step S109, whereas if it is decided that the decentering quantity is not equal to or beyond the predetermined value, the operation proceeds to step S103. In step S103, photometering processing is executed by the photometering device 7, and the aperture value, the shutter speed or the like is determined as necessary in correspondence to the subject luminance value calculated through the photometering processing. In addition, focus match-processing for achieving a focus match by driving the focal adjustment optical system of the imaging lens 3 is executed based upon the extent of defocusing calculated by the focus detection device 10.

In step S104, a decision is made as to whether or not the halfway press operation of the shutter release button 60 is sustained. If it is decided that the shutter release button 60 is still in the halfway pressed state, the operation proceeds to step S105, whereas if it is decided that the halfway press operation of the shutter release button 60 has ended, the processing itself ends. In step S105, a decision is made as to whether or not the shutter release button 60 is pressed all the way down (whether or not the SW2 is in an ON state). If it is decided that the shutter release button 60 is pressed all the way down, the operation proceeds to step S107, whereas if it is decided that the shutter release button 60 is not pressed all the way down, the operation proceeds to step S106.

In step S106, a decision is made as to whether or not C-AF (continuous AF) is currently in effect in conjunction with the autofocus drive mode. If C-AF is in effect in the autofocus mode, the operation returns to step S103, whereas if C-AF is not in effect in the autofocus mode, the operation returns to step S104. In step S107, the stored electrical charges at the imaging element 12 are reset. Then, in step S108, the mirror 4 is raised, the aperture (not shown) is adjusted so as to achieve the aperture value having been selected, and then the shutter curtain at the shutter 11 is opened. Subsequently, the operation proceeds to step S115.

In step S109, the mirror 4 is raised and the shutter curtain of the shutter 11 is opened. In step S110, photometering processing is executed by the image processing unit 53 and the control unit 50 by using the signals output by the imaging element unit 52, and the aperture value, the shutter speed or the like is determined as necessary in correspondence to the subject luminance value calculated through the photometering processing. In addition, the control unit 50 executes focus match processing for driving the focal adjustment optical system of the imaging lens 3 to the focus match position through the contrast AF method described above based upon the signals output by the imaging element unit 52. Then, image signals continuously output from the imaging element unit 52 are sequentially processed, thereby starting reproduction of a dynamic image (through image display) at the rear liquid crystal monitor 13.

In step S111, a decision is made as to whether or not the halfway press operation (the SW1 in an ON state) of the shutter release button 60 is sustained. If the shutter release button 60 is determined to be still pressed halfway down, the operation proceeds to step S112. If, on the other hand, it is decided that the shutter release button 60 is no longer pressed halfway down, the dynamic image reproduction is halted, and the operation proceeds to step S116 after closing the shutter curtain at the shutter 11. In step S112, a decision is made as to whether or not the shutter release button 60 is pressed all the way down (whether or not the SW2 is in an ON state). If the shutter release button 60 is determined to be pressed all the way down, the operation proceeds to step S113, whereas if it is decided that the shutter release button 60 is not pressed all the way down, the operation returns to step S111. In step S113, the dynamic image reproduction is halted, and the aperture (not shown) is adjusted to the aperture value having been selected as described earlier. Then, after resetting the stored electrical charges at the imaging element 12 in step S114, the operation proceeds to step S115.

In step S115, the shutter curtain at the shutter 11 is closed in conformance to the shutter speed having been set, the electrical charge storage at the imaging element 12 is stopped and the aperture (not shown) is reset to the open position. In step S116, the mirror 4 is lowered, thereby ending the imaging processing.

As described above, if an imaging lens that does not allow a shift operation or a tilt operation is mounted at the camera body 1 (if a negative decision is made in step S101), or if an imaging lens 3 allowing a shift operation or a tilt operation is mounted at the camera body 1 but the extent of decentering, i.e., the extents of tilt and shift, is equal to or less than a predetermined value (if a negative decision is made in step S102), photometering processing by the photometering device 7 and focus match processing based upon the output from the focus detection device 10 are individually executed in step S103 with great accuracy.

If, on the other hand, it is decided that an imaging lens 3 allowing a shift operation or a tilt operation is mounted at the camera body 1 and the extent of decentering, i.e., the extent of tilt or shift, is equal to or beyond the predetermined value (if an affirmative decision is made in step S102), an image is formed with a subject light flux at the imaging element 12 and photometering processing and focus match processing are executed based upon signals output from the imaging element 12 in steps S109 and S110. In other words, even under conditions in which a significant error is likely to manifest in the photometry by the photometering device 7 or in the focus detection operation executed by the focus detection device 10, photometering processing and focus match processing can be executed with accuracy based upon the output signals provided by the imaging element 12.

It is to be noted that while the stored electrical charges at the imaging element 12 are reset in step S114 and then the operation directly shifts into the imaging processing in step S115 in the explanation provided above, the shutter 11 may be first closed to block the subject light, the stored electrical charges at the imaging element 12 may be reset and then the shutter 11 may be opened again in step S114 before the operation shifts into the imaging processing in step S115 instead. By adopting such an alternative, it is ensured that the stored electrical charges at the imaging element 12 are reset without being affected by external light.

In addition, the mirror 4 may be lowered and the shutter curtain at the shutter 11 may be closed upon completion of the photometering processing and the focus match processing, without executing the dynamic image reproduction in step S110. In such a case, the stored electrical charges at the imaging element 12 may be reset, the mirror 4 may then be raised and the shutter curtain may be opened in step S114. This allows the user to recheck the subject through the optical viewfinder after the photometering processing and the focus match processing end.

While an explanation is given above in reference to an embodiment of the present invention, the present invention is not limited to this example.

For instance, when the shift quantity or the tilt quantity is equal to or beyond the predetermined value and the photometering processing and the focus match processing are executed based upon the signals output from the imaging element 12, the subject luminance may be calculated through the center-weighted light reading of the known art by using the image data over the central area of the subject image alone. In addition, the predetermined value mentioned earlier (e.g., the shift quantity at ±2 mm or the tilt quantity at ±3°) may be designated as a first predetermined value and a second predetermined value (e.g., the shift quantity at or beyond ±3 mm or the tilt quantity at or beyond ±4°) indicating a greater extent of shift or a tilt than the first predetermined value may be further designated. In such a case, the photometering processing and the focus match processing should be executed by using the output signals provided by the imaging element 12 when the shift quantity or the tilt quantity is equal to or beyond the first predetermined value, and if the shift quantity or the tilt quantity is equal to or beyond the second predetermined value, the subject luminance may be calculated based upon the output signal provided by the imaging element 12 through the center-weighted light reading of the known art by using only the image data over the central area of the subject image. This alternative ensures that highly accurate photometering processing is executed even when a great extent of shift or tilt has induced an eclipse.

It is to be noted that in the embodiment, the photometering processing and the focus match processing are executed based upon the output signals from the imaging element 12 when the extent of shift or tilt is equal to or beyond the predetermined value. However, the present invention is not limited to this example and the camera may instead be set so as to execute the photometering processing and the focus match processing based upon the output signals provided by the imaging element 12 regardless of the shift quantity or the tilt quantity if any shift or tilt of the imaging optical system 3a is detected at all. Alternatively, the photometering processing and the focus detection processing may be executed based upon the output signals from the imaging element 12 invariably, as long as an imaging lens 3 allowing a shift or tilt is mounted at the camera body 1.

Furthermore, an explanation is given above in reference to the embodiment in which the imaging lens 3 mounted at the imaging device is an interchangeable lens that can be decentered by shifting or tilting at least part of the imaging optical system 3a. However, the imaging lens 3 is not limited to this example and the present invention may be adopted in conjunction with any type of imaging lens 3 as long as the optical axis of at least one of the lenses constituting the imaging lens 3 can be decentered relative to the imaging element 12. For instance, it may be adopted in conjunction with an imaging lens that only allows either a shift or a tilt.

Moreover, the imaging lens 3 may be a special lens. The term "special lens" in this context refers to a lens from which lens information cannot be transmitted to the camera body 1 or a telephoto lens. It is to be noted that the term "lens information" in this context refers to lens inherent information, information indicating the lens state and the like. If a lens from which the lens information cannot be transmitted to the camera body 1 or from which only part of the lens information can be transmitted (e.g., a manual focus lens) is mounted at the camera body 1, accurate or precise photometering processing cannot be executed by the photometering device 7. In addition, if a telephoto lens or, in particular, if a super-telephoto lens is mounted at the camera body 1, the depth of field becomes extremely small, i.e., close to or even exceeding the detection resolution achieved with the focus detection device 10 through the phase difference detection method. Accordingly, the control may be switched so as to execute the photometering processing and the focus match processing based upon the output signals provided by the imaging element 12 when such a special lens is mounted at the camera body 1.

The control unit 50 at the camera body 1 detects the lens information from the imaging lens 3 mounted thereat and makes a decision as to whether or not the imaging lens 3 is a special lens based upon the detection results. For instance, if the communication between the mounted imaging lens 3 and the camera body 1 is disabled, if the lens information from the imaging lens 3 is missing, or if information indicating the imaging lens type is input by the user via the operation unit 61, the control unit may judge that a special lens is currently mounted. Thus, the photometering processing and the focus match processing can be executed in a desirable manner even when a special lens is mounted without having to provide a special mechanism.

While an explanation is given above in reference to the embodiment on an example in which the present invention is adopted in a lens interchangeable single lens reflex digital camera which allows the use of a detachable imaging lens 3, the present invention is not limited to this example. For instance, the present invention may be adopted in a digital camera equipped with an integrated permanent lens, which includes a decenterable imaging lens, or it may be adopted in an imaging device other than a still camera such as a digital video camera. p The above described embodiment is an example, and various modifications can be made without departing from the scope of the invention.

What is claimed is:

1. An imaging device, comprising:
   an imaging element that receives a subject light flux from an imaging lens that forms a subject image, and converts the subject light flux to an electrical signal; and
   a control device that, in correspondence to an extent of decentering of the imaging lens, selects one of first imaging preparatory processing for executing imaging preparatory processing based upon an output signal from the imaging element and second imaging preparatory processing for executing imaging preparatory processing based upon an output signal from a light receiving element other than the imaging element.

2. An imaging device according to claim 1, wherein:
   the imaging preparatory processing includes one of photometering processing for calculating a subject luminance value and focus match processing for focusing the imaging lens on a subject.

3. An imaging device according to claim 2, wherein:
   the light receiving element comprises one of a photometering sensor that outputs a signal to be used in the photometering processing and a focus detection sensor that outputs a signal to be used in the focus match processing.

4. An imaging device according to claim 1, wherein:
   the control device executes the imaging preparatory processing through the second imaging preparatory processing if the extent of decentering of the imaging lens is less than a predetermined value and executes the imaging preparatory processing through the first imaging preparatory processing if the extent of decentering of the imaging lens is equal to or beyond the predetermined value.

5. An imaging device, comprising:
   an imaging element that receives a subject light flux from an imaging lens that forms a subject image, and converts the subject light flux to an electrical signal that is subjected to image processing to create image data to be recorded;
   a lens information detection device that detects lens information corresponding to the imaging lens; and
   a control device that, in correspondence to results of detection executed by the lens information detection device, selects one of a focus match processing by a contrast AF method for executing imaging preparatory processing based upon an output signal from the imaging element and a focus match processing by a phase difference detection method for executing imaging preparatory processing based upon an output signal from a light receiving element other than the imaging element.

6. An imaging device according to claim 5, wherein:
   the lens information detection device detects information indicating whether or not the imaging lens allows a shift or a tilt as the lens information.

7. A camera body of a digital camera that allows an imaging lens to be detachably mounted, comprising:
   an imaging element that receives a subject light flux from the imaging lens and converts the subject light flux to an electrical signal that is subjected to image processing to create image data to be recorded;
   a lens information detection device that detects lens information corresponding to the imaging lens; and
   a control device that, in correspondence to results of detection executed by the lens information detection device, selects one of a focus match processing by a contrast AF method for executing imaging preparatory processing based upon an output signal from the imaging element and a focus match processing by a phase difference detection method for executing imaging preparatory processing based upon an output signal from a light receiving element other than the imaging element.

* * * * *